United States Patent

[11] 3,610,308

| [72] | Inventor | Peter McDonald<br>Hudson, Ohio |
|---|---|---|
| [21] | Appl. No. | 863,090 |
| [22] | Filed | Oct. 2, 1969 |
| [45] | Patented | Oct. 5, 1971 |
| [73] | Assignee | The Firestone Tire & Rubber Company<br>Akron, Ohio |

[54] PNEUMATIC TIRE
17 Claims, 7 Drawing Figs.

[52] U.S. Cl..................................................... 152/158,
152/341
[51] Int. Cl....................................................... B60c 17/04
[50] Field of Search......................................... 152/158,
341

[56] References Cited
UNITED STATES PATENTS

| 2,021,500 | 11/1935 | De Vita | 152/158 |
| 598,850 | 2/1898 | Bowley | 152/158 |
| 2,045,341 | 6/1936 | Bourdon | 152/158 |
| 2,779,380 | 1/1957 | King | 152/341 |
| 3,392,772 | 7/1968 | Powers | 152/158 |
| 3,509,928 | 5/1970 | Aghnides | 152/158 |

*Primary Examiner*—Arthur L. La Point
*Assistant Examiner*—D. W. Keen
*Attorneys*—S. M. Clark and David A. Thomas

ABSTRACT: This disclosure relates to a tire construction which gives an improvement in the run flat characteristics of the tire construction described and claimed in U.S. Pat. No. 3,392,772 and, therefore, an improvement in the safety features of the tire. This improved construction comprises locating an annular safety rib member radially outwardly of and in substantially the same radial plane as each bead and rim flange area in the tire described in U.S. Pat. No. 3,392,772; these safety rib ring members may be either cured integrally with the tire or may be cured as a separate ring and then cemented to the proper locations on the inner surface of the separately cured tire.

PATENTED OCT 5 1971 3,610,308
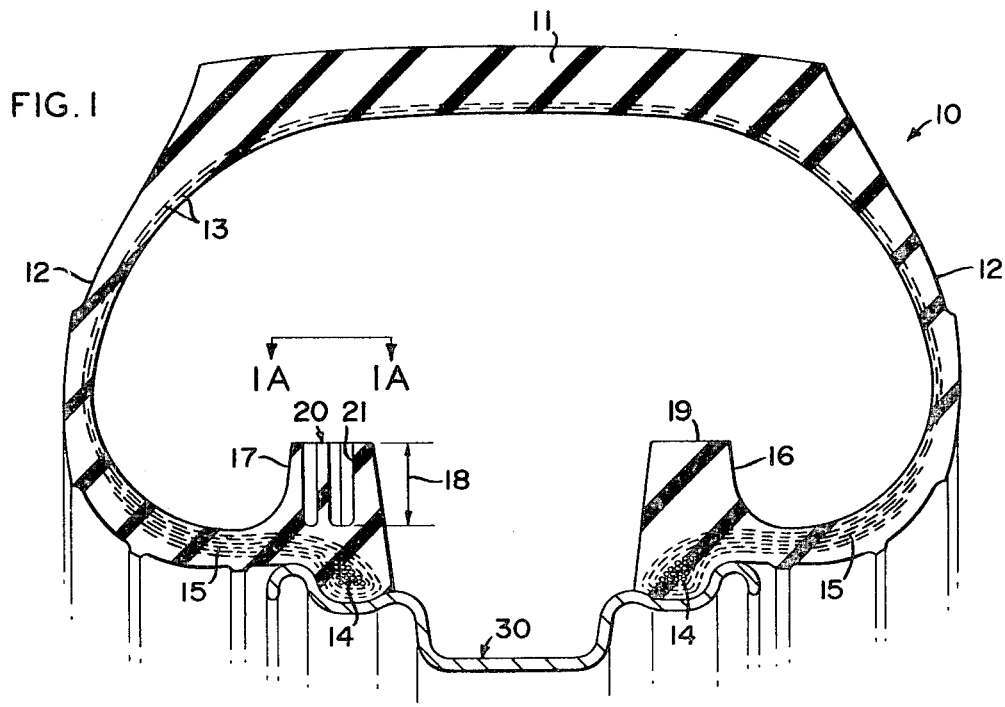
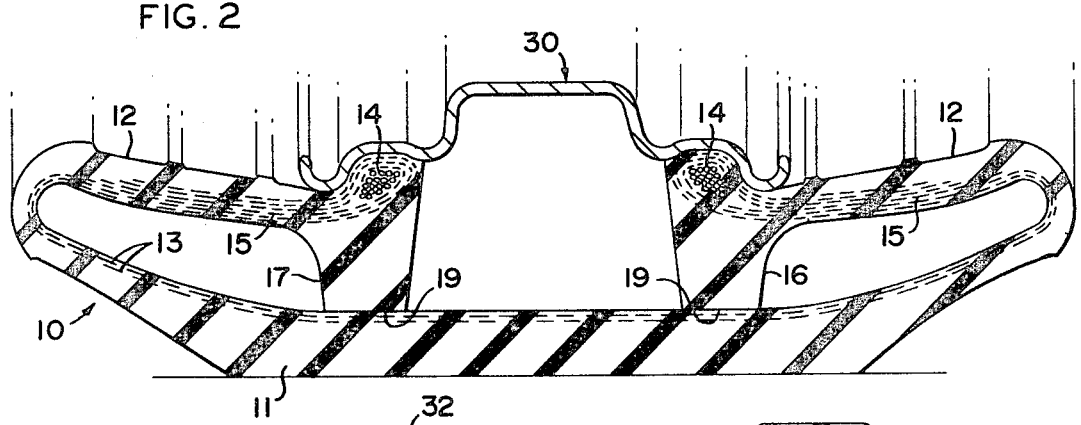
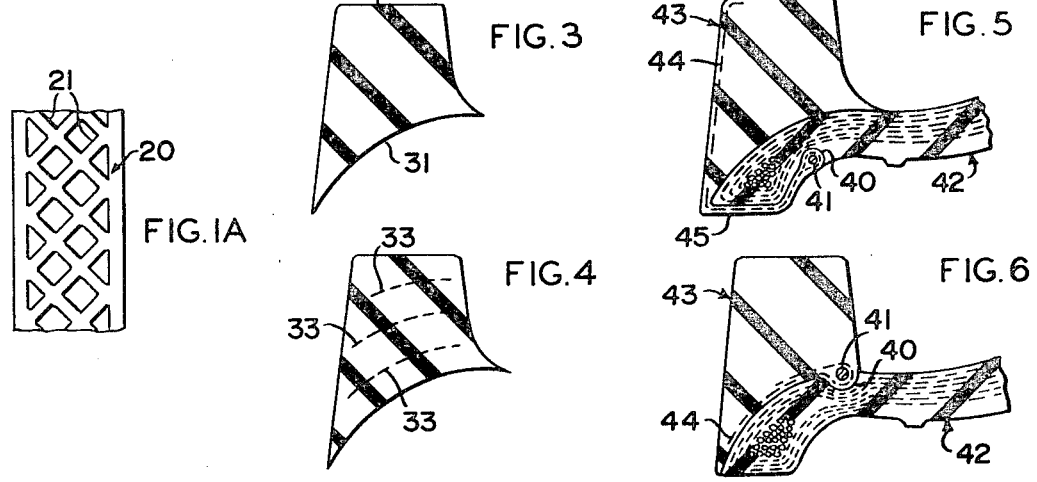

PNEUMATIC TIRE

DISCUSSION OF THE PRIOR ART

This invention is an improved form of the tire construction described and claimed in U.S. Pat. No. 3,392,772. This tire construction consists of a tire with a relatively small bead width (that is, the lateral distance between the two beads of the unmounted, cured tire) relative to the cross-sectional width of the tire in which the sidewall portions immediately adjacent the rim flanges in the tire-rim combination extend in a cantilever fashion, so that these sidewall portions are substantially parallel to the axis of rotation of the tire; these cantilever portions of the sidewalls are each reinforced by stabilizer members to give the tire of this construction the proper ride and handling characteristics. Due to this unique cross-sectional shape, the tire disclosed and claimed in U.S. Pat. No. 3,392,772 has good run flat characteristics and is well adapted to combinations with run flat devices. One example of such a run flat device is disclosed in U.S. Pat. No. 3,392,772.

BACKGROUND OF THE INVENTION

This invention comprises an improved safety construction in the tire construction described and claimed in U.S. Pat. No. 3,392,772 by providing the tire construction with safety ribs which provide excellent run flat characteristics to the tire. Tires with good run flat characteristics are presently much in demand for passenger cars, trucks, military vehicles and airplanes and many run flat devices have been disclosed and patented in the past; however, all of these devices have at least the drawbacks of added cost, extra pieces to be assembled, cumbersome mounting of the tire and run flat device on the tire rim, added weight which causes the tire-rim flat device, rim combination to generate excess heat while in operation, and, lastly, no protection of the tire when it is run in an uninflated condition so the tire may be destroyed by operation while running on the run-flat device. Tires with conventional cross-sectional shapes do not form stable structures when deflated, even with known run flat devices. The road engaging tread surface is not held sufficiently rigid but is allowed to "-wobble" resulting in an unstable structure and allowing the deflated tire to actually ride on its sidewall areas which results in destruction of the tire and great difficulty in controlling a vehicle with such a deflated tire-rim flat device combination. The improved construction which is the subject of this invention does not have these drawbacks and is mounted on a tire rim as an integral unit so that the mounting of the tire of this invention is accomplished in the same manner (with no additional problems) as the mounting of a standard tire. The integral unit of the tire of this construction comprises a tire construction as described and claimed in U.S. Pat. No. 3,392,772 having safety rib members and may be obtained in two ways; firstly, it may be obtained by building and curing the safety ribs as one unit with the tire itself or, secondly, by separately curing the safety ribs and then cementing the cured safety ribs to the proper locations in the inner surface of the separately cured tire and then, if necessary, curing the safety ribs to the tire.

The objects of this invention are to provide a tire that has excellent run flat characteristics: (1) without adding unduly excess weight, (2) with only insignificant increase in cost, (3) no extra pieces to be mounted on the tire rim with the tire, and (4) with excellent protection of the tire construction while running in an uninflated condition thereby preventing destruction of the tire body.

Specifically, the novel construction of this invention consists of a tire as described and claimed in U.S. Pat. No. 3,392,772 in which annular safety rib members of rubber are located on the inner surface of the tire in an area that is radially outwardly of and in substantially the same radial plane as the bead ring and rim flange of the tire-rim combination so that when the tire is deflated a very stable structure is formed which includes: (1) the road engaging, tread surface of the tire; (2) the two safety ribs; (3) the two bead rings of the tire; and (4) the rim flanges of the rim. This direct line of support enables the construction of this invention to be run uninflated and still maintain the tire mounted on the rim in its proper positions without any breaking of the bead seats and the resulting movement of the beads from their proper places adjacent the rim flanges. This bead movement occurs in other run flat-tire combinations and always results in a destruction of the tire. Due to the fact that the tire bead is directly a part of the line of support for the tire-rim combination when the tire is run uninflated, the beads will not move and will remain properly seated on the rim, thus preventing any injury to the tire when it is run flat. Also, the unique cross-sectional shape of the tire described and claimed in U.S. Pat. No. 3,392,772 readily allows the sidewalls to fold down (as shown in FIG. 2) when the tire is deflated so that the sidewalls do not come between the road engaging tread surface and the bead-rim combination and interfere with the direct line of support referred to above. Tires of conventional cross-sectional shapes do not have this advantage and often the sidewalls of such tires will be folded under and come between the road engaging surface and the bead-rim combination when the tire is deflated thereby causing an unstable and dangerous deflated tire and probable injury to the deflated tire.

This construction provides an excellent safety feature in that it enables a driver to retain complete control of the vehicle even though a tire may lose air pressure, either slowly or instantaneously, and to move the disabled vehicle to an uncongested area to make the necessary repairs; thereby eliminating any possible accidents that might be caused by the out-of-control vehicle or by the traffic hazard caused by the disabled vehicle on a highly congested, high speed highway.

It is contemplated that the safety rib member may have any cross-sectional shape so long as it performs its function of being a supporting rib between the road engaging tread surface of the tire and the bead-rim flange area of the tire-rim combination. Also, this safety rib may or may not be reinforced with standard tire reinforcing materials, such as tire body fabrics or layers thereof. Preferably, these safety ribs are constructed of rubber; they may be solid rings or they may contain cavities whose walls are formed by webs of rubber. Also, the safety rib member may be circumferentially continuous or it may be circumferentially non-continuous by being made up of a series of lugs or the like which are capable of supporting the load of the vehicle.

TECHNICAL DISCLOSURE OF THE INVENTION

FIG. 1 is a cross-sectional view of the novel tire construction of this invention depicting the construction mounted on a tire rim.

FIG. 1A is a view taken along line 1A—1A of FIG. 1.

FIG. 2 is a cross-sectional view of the novel tire construction of this invention depicting it mounted on a tire rim and deflated to show the line of support formed in the tire-rim combination with the tire of this invention when it is supporting the load of the vehicle when the tire is uninflated.

FIG. 3 is a cross-sectional view of a separately cured safety rib member.

FIG. 4 is another embodiment of FIG. 3 showing reinforcing plies in the safety rib members.

FIGS. 5 and 6 are partial cross-sectional views of the tire of this invention showing other embodiments of the safety rim members.

Referring to FIG. 1, the tire of this construction is depicted generally as 10 which is comprised of the road engaging tread portion 11, sidewalls 12, layers of standard tire cord plies 13 (these plies may be comprised of any of the standard tirecord fabrics which are well known in the industry; such as rayon, nylon or polyester), standard tire beads 14 (which are constructed by any means known in the art and usually comprise several layers with each layer containing continuous bead wire), cantilever area sidewall stabilizer members 15 (as disclosed in U.S. Pat. No. (3,392,772), safety ribs 16 and 17, and tire rim 30. The safety ribs 16 and 17 may either be integrally cured with the tire or they may be separately cured as rings or as long strips and then assembled with a separately cured tire; this assembly may be accomplished by any of the known means, such as, the buffing of the joining surfaces of the safety rib and the inner surface of the tire, followed by the cementing and joining of the surfaces. Of course, if the safety rib is in the form of a long strip, it will have to be cut to size and the ends joined together to form an annulus—this "splicing" may be done prior to the assembly with the tire or at the same time as the assembly with the tire. FIGS. 3 and 4 are cross-sectional views of such separately cured safety ribs which may be assembled with a separately cured tire in the manner set out above. In addition, FIG. 4 contains an additional embodiment of the safety rib in that reinforcing the plies of standard tirecord fabric are located in the safety rib; these layers of tirecord fabric are depicted as 33 in FIG. 4. This invention contemplates that the safety ribs may contain the reinforcing fabric regardless of its manner of assembly with the tire; that is, the safety ribs may contain such fabric independent of whether the ribs are integrally cured with the tire or separately cured and assembled with a separately cured tire at some later time.

The left-hand side of FIG. 1 depicts another embodiment of the safety rib. This embodiment, reference 17, shows, in essence, a semisolid safety rib construction in that the rib contains a webbed structure referred to as 20, which defines cavities 21. This web structure and the resulting cavities may extend for the entire depth of the safety rib, the distance 18 in FIG. 1, or may extend for only a portion of the depth of the safety rib. By this webbing treatment, an embodiment of which is to be seen in FIG. 1A, additional weight can be taken from the tire; it is only necessary that the safety rib be sufficiently rigid to form a stable bridge between the road engaging tread surface and the rim-tire bead combination, and thereby supporting the weight of the vehicle when the tire is uninflated. In this same vein, the safety rib member may be circumferentially noncontinuous, as opposed to a circumferentially continuous member, as for example, a series of lugs or a rib having peaks separated by valleys.

It is contemplated that the safety ribs should be made of rubber, preferably the type of rubber that is utilized for tire tread compounds or bead insulation compounds when the rib is integrally cured with the tire. When the rib is separately cured the material utilized may be any material which would give a rib of sufficient rigidity to provide a supporting bridge between the tread surface of the tire and the rim-bead area and would have a sufficient adhesive characteristic to form an adequate bond with the rubber inner surface of the tire; preferably, the separate safety rib would also be formed of a rubbery compound, such as a compound similar to the tire tread compound.

FIG. 2 depicts a cross-sectional view of the tire of this invention mounted on a rim when the tire if deflated showing the safety ribs operation giving the direct line of support by forming a bridge between the road engaging tread surface and the tire bead-rim combination with the sidewalls displaced axially outwardly of this stable structure with no possibility of interfering with it. It is evident from this figure that the tire would have a great amount of stability in the deflated condition which would enable the driver to safely bring his vehicle to a stop; and, additionally, enable the driver to drive for some period of time on the deflated tire so that the driver could either get to a less congested area to change the tire or to a gas station to change the tire. Also, it is evident from this figure that the tire will not be damaged or destroyed by the safe stopping of the vehicle or by the additional driving of the vehicle on the tire when it is deflated. Therefore, the novel construction of the tire of this invention provides a tire with built-in safety ribs which will enable a driver when a tire loses pressure, either slowly or instantaneously, to bring his vehicle safely to a stop, without loss of control, and will enable the driver to move his vehicle to an uncongested area to change the tire.

FIGS. 5 and 6 are partial cross-sectional views of a tire containing yet further embodiments of the construction of this invention. In each of these embodiments, the safety rib is cured in a separate step and then applied to the separately cured tire prior to the mounting of the assembly onto the tire rim. Specifically, each of these embodiments shows a safety rib which contains a bead wire type annulus, 41, which is adapted to fit in an annular groove in the bead area of the tire. This construction results in the safety rib being securely attached to the tire, thereby eliminating the need of cementing safety ribs of this type to the tire. In FIGS. 5 and 6, the bead area of the tire is set out generically as 42; the safety rib identified generically as 43; and a reinforcing fabric in the safety rib identified as 44. FIG. 5 shows an embodiment in which the safety rib contains a flap, reference 45, that is adapted to wrap around the bead area of the tire, thereby engulfing the bead area of the tire with the wire bead of the safety rib, 41, located at the edge of the flap so that it will rest in a companion groove, 40, in the tire bead area. FIG. 5 depicts the tire reinforcing type cord wrapped around the bead of the flap and reinforcing the entire area of the flap so that the flap cannot be torn off the safety rib during tire mounting or while in service. In the embodiment shown in FIG. 6, the bead ring in the safety rib, 41, is again engulfed by tire cord type reinforcing fabric, 44. The bead ring, 41, is located in the area of the safety rib that is adjacent to the inner surface of the tire but axially outwardly of the tire bead so that the safety rib bead ring rests axially outwardly of the tire bead ring. The tire bead construction is adapted to contain an annular groove, 40, which corresponds to the bead ring, 41, of the safety rib, thereby providing a strong mechanical bond between the safety rib and the tire.

The height of the safety ribs in relation to the section height of the tire is a factor which must be considered; if the rib is too short it will not provide an adequate bridge to give enough stability to the road-engaging surface of the tire when it is deflated to enable the driver to safely bring his vehicle to a controlled stop and, additionally, would result in the probable destruction of the tire as a result of its being run in the uninflated condition; also, if the height of the rib is too high it will not sufficiently support the weight of the vehicle and would result in the safety rib buckling, giving an unstable construction when the tire was deflated and probably causing injury to the tire when it was deflated or run in a deflated condition. Of course, it is possible to make the safety rib bulkier and thereby give the rib sufficient rigidity even at a greater height to enable it to function as a run flat supporting rib; however, the increased bulk adds cost and weight to the tire and it is, therefore, the object to design the tire to have the least amount of bulk in the safety ribs. In determining a workable height for the safety rib, the height that the safety rib maintains when the tire is deflated and the safety rib is under load supporting the load of the vehicle is the height to consider. This under load height of the safety rib will always be less than its unloaded height of the safety rib will be compressed by the load of the vehicle that it carries. This deflected height of the safety rib has to be above a certain distance so that the safety rib will function as intended; specifically, the deflected height of the safety rib should be no less than 25 percent of the inflated section height of the tire and no greater than 75 percent of the inflated section height of the tire when the width of the safety rib is approximately 10 percent of the inflated section width of the tire. Of course, this ratio may be varied within this range by varying the bulk of the safety rib or the material from which the safety rib is constructed but it must always be greater than 25 percent. This minimum height of the under load safety rib is critical to the operation of this invention, whereas the maximum height of the safety rib is not as critical. This maximum height should only be such that the tire deflection caused by normal operating conditions should not result in the tire rubbing on or deflecting the safety rib.

The novel tire construction of this invention is further implemented by the addition of a lubricant into the air cavity of the inflated tire. This lubricant thereby facilitates the running of the deflated tire on the safety ribs by eliminating friction between the safety ribs and the crown of the tire. It is also contemplated that the radially outward surface of the safety ribs (surface 19 in FIG. 1, for example) may be coated with some lubricant to facilitate the operation of the safety rib in supporting the load of the vehicle when the tire is deflated. Liquid silicon or other lubricants of this type are contemplated in this use.

The novel tire construction of this invention may be utilized in tires designed for use on passenger cars, trucks, military vehicles, airplanes, off-the-road equipment, and racing cars. Also, this novel construction may be utilized with two body constructions of either the conventional bias type or the radial type which has the cords in the body plies forming approximately right angles with the circumferential tread centerline and low angle cords in the tread ply belts.

I claim:

1. A pneumatic tire construction of the cantilever sidewall type having two independent, axially spaced apart, direct lines of support to carry the load of a vehicle upon which the tire is mounted when the tire is deflated, each said independent, direct line of support comprising a tire bead, a safety rib integral with said bead and located radially outwardly thereof, and a portion of the road engaging tread surface, all of said parts of each said direct line of support being located in substantially one radial plane so that when the tire is carrying a load and is deflated due to a loss of internal air pressure the weight of the vehicle is carried by the two independent, direct lines of support thereby giving a very stable deflated tire construction.

2. The pneumatic tire construction of claim 1 in which the safety rib is reinforced by tire cord type fabric.

3. The pneumatic tire construction of claim 1 in which the safety rib has a web structure which forms hollow cavities.

4. The pneumatic tire construction of claim 1 in which the safety rib is circumferentially continuous.

5. The pneumatic tire construction of claim 1 in which the safety rib is comprised of a plurality of lugs.

6. The pneumatic tire construction of claim 1 in which the minimum height of the safety rib under load is at least 25 percent of the inflated section height of the tire.

7. The pneumatic tire construction of claim 1 in which the radially outward surface of the safety rib contains a lubricant to reduce friction when the safety rib is under load.

8. The pneumatic tire construction of claim 1 in which the tire bead area has an annular groove and the safety rib contains an annular bead adopted to fit said annular groove.

9. In combination, a pneumatic tire of the cantilever sidewall type and a rim, said rim comprising opposed bead seats terminating in flanges and having a width substantially less than the section width of the inflated tire, said combination having two independent, axially spaced apart, direct lines of support to carry the load of the vehicle when the tire is deflated, each said independent, direct line of support comprising a tire rim bead seat, a tire bead seated thereon, a safety rib integral with said bead and located radially outwardly thereof, and a portion of the road-engaging tread surface, all of said parts of each said direct line of support being located in substantially one radial plane so that when the tire is deflated due to a loss of internal air pressure, the weight of the vehicle is carried by the two independent, direct lines of support thereby giving a very stable deflated tire-rim combination.

10. The combination of claim 9 in which said safety rib is reinforced by tire cord type fabric.

11. The combination of claim 9 in which said safety rib has a web structure which forms hollow cavities.

12. The combination of claim 9 in which said safety rib is circumferentially continuous.

13. The combination of claim 9 in which said safety rib is comprised of a plurality of lugs.

14. The combination of claim 9 in which the minimum height of said safety rib under load is at least 25 percent of the inflated section height of the tire.

15. The combination of claim 9 in which the radially outward surface of said safety rib contains a lubricant to reduce friction when the safety rib is under load.

16. The combination of claim 9 in which the tire air cavity contains a lubricant to reduce friction when the safety rib is under load.

17. The combination of claim 9 in which each tire bead portion has an annular groove and each safety rib contains an annular bead adopted to fit said annular groove.

PO-1050
(5/69)

UNITED STATES PATENT OFFICE
CERTIFICATE OF CORRECTION

Patent No. 3,610,308          Dated October 5, 1971

Inventor(s) Peter McDonald

It is certified that error appears in the above-identified patent and that said Letters Patent are hereby corrected as shown below:

Column 1, line 45 "rim" should read -- -run --;

Column 1, line 63 insert --with-- before "no";

Column 2, line 64 candel "rim" and insert in lieu thereof --rib--;

Column 2, line 75, cancel "(" after word "No.";

Column 3, line 39, cancel "noncontinuous" and insert in lieu thereof --non-continuous--;
                                     (first occurrence)
Column 4, line 56 cancel "of the"/and insert in lieu thereof --in that the--;

Column 5, line 13, should read --bias angle type-- instead of "bias type";

Column 5, claim 1, line 25, "road engaging" should read --road-engaging--.

Signed and sealed this 28th day of March 1972.

(SEAL)
Attest:

EDWARD M. FLETCHER, JR.
Attesting Officer

ROBERT GOTTSCHALK
Commissioner of Patents